March 16, 1937.  H. L. ADAMS  2,074,098
ROCKET AIRSHIP
Filed Aug. 23, 1932   5 Sheets-Sheet 1
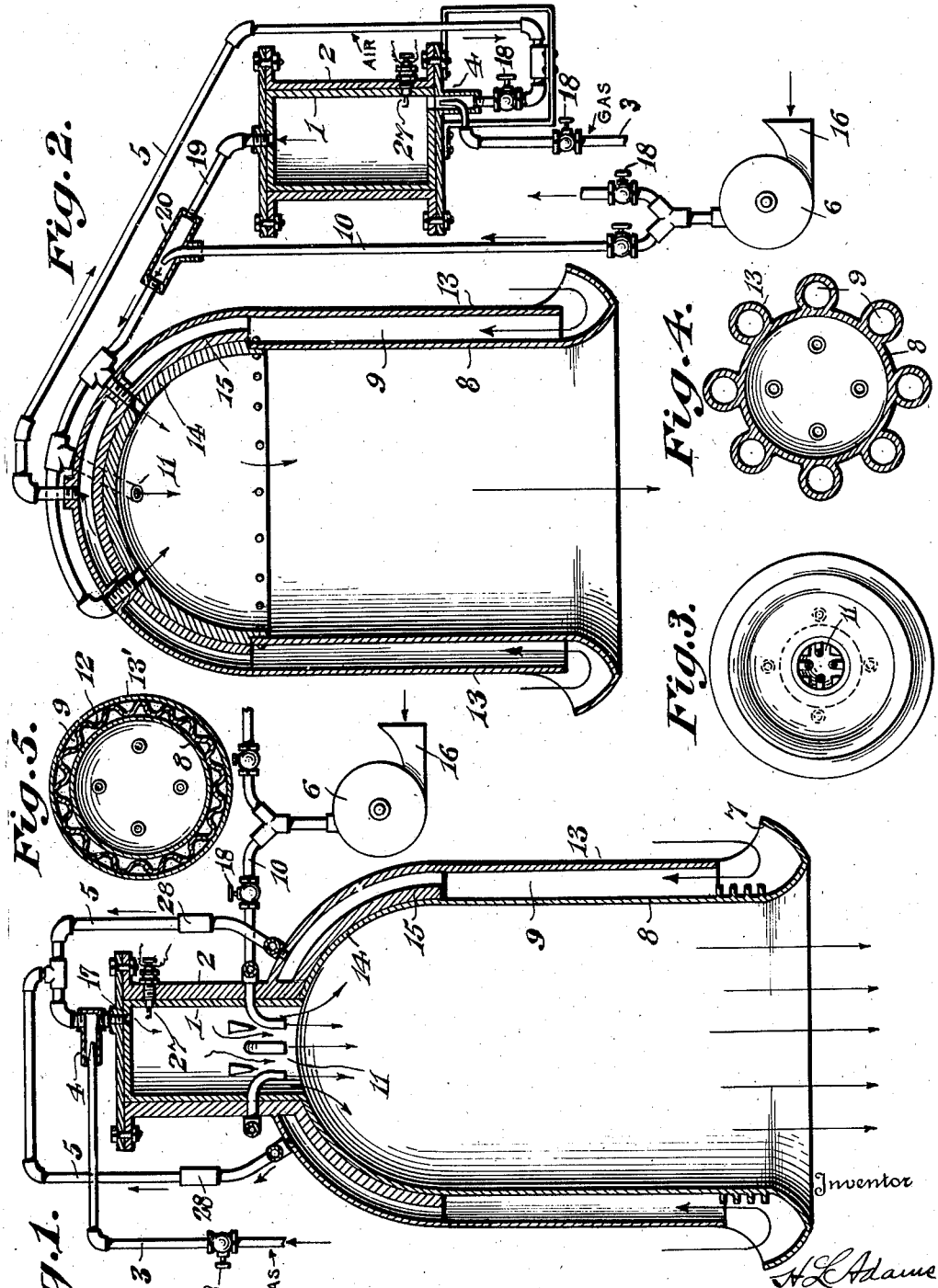
Inventor
H. L. Adams March 16, 1937. H. L. ADAMS 2,074,098
ROCKET AIRSHIP
Filed Aug. 23, 1932 5 Sheets-Sheet 2
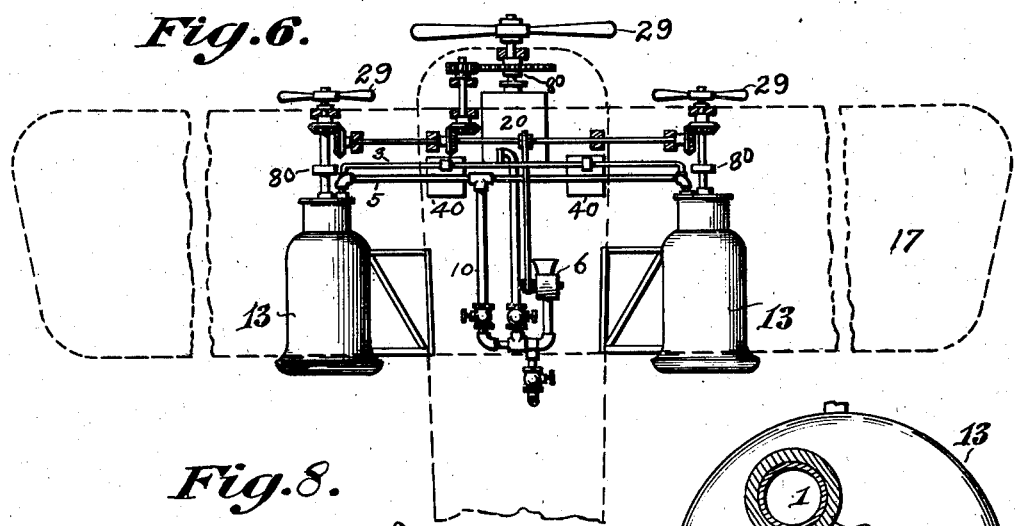
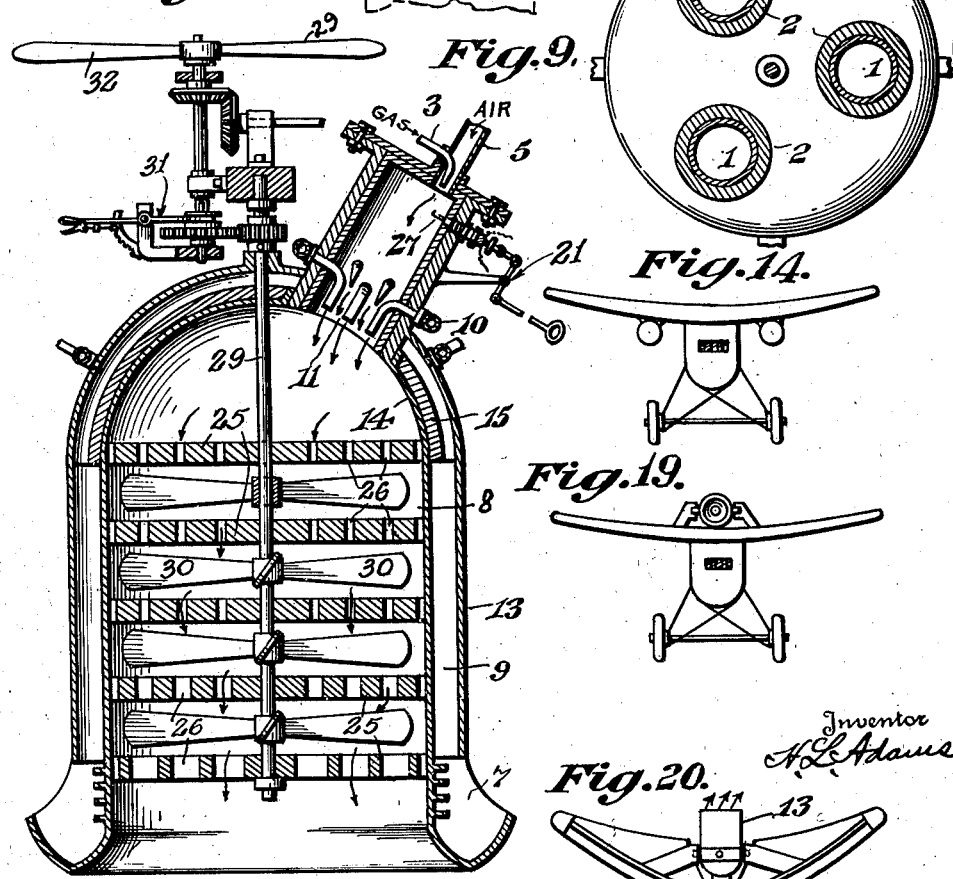
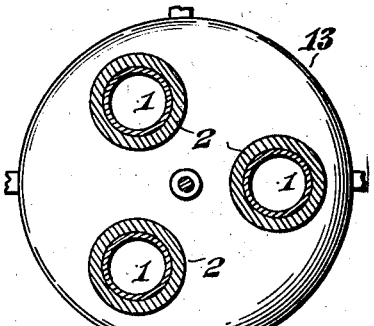
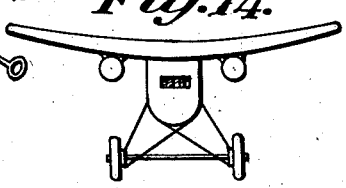
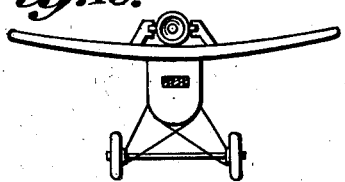
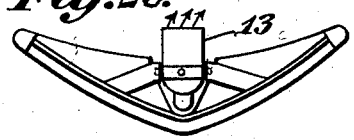

March 16, 1937. H. L. ADAMS 2,074,098
ROCKET AIRSHIP
Filed Aug. 23, 1932  5 Sheets-Sheet 3
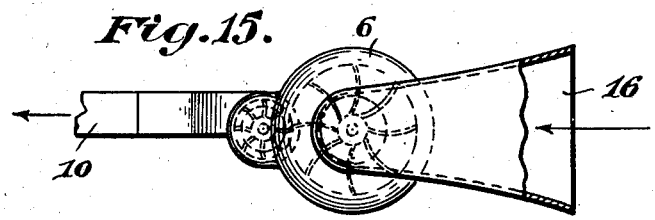
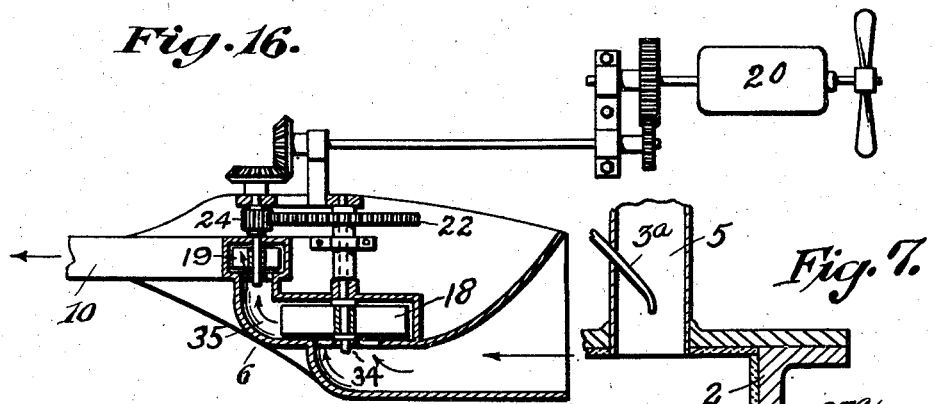
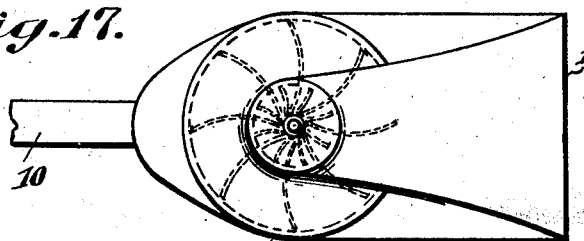
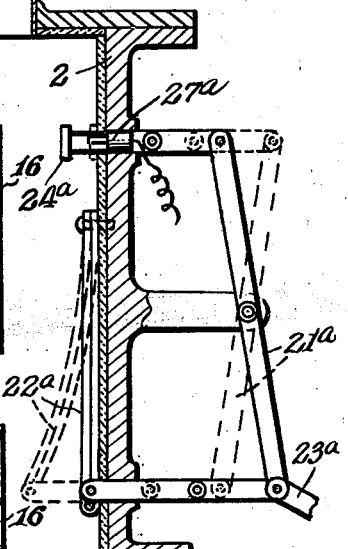
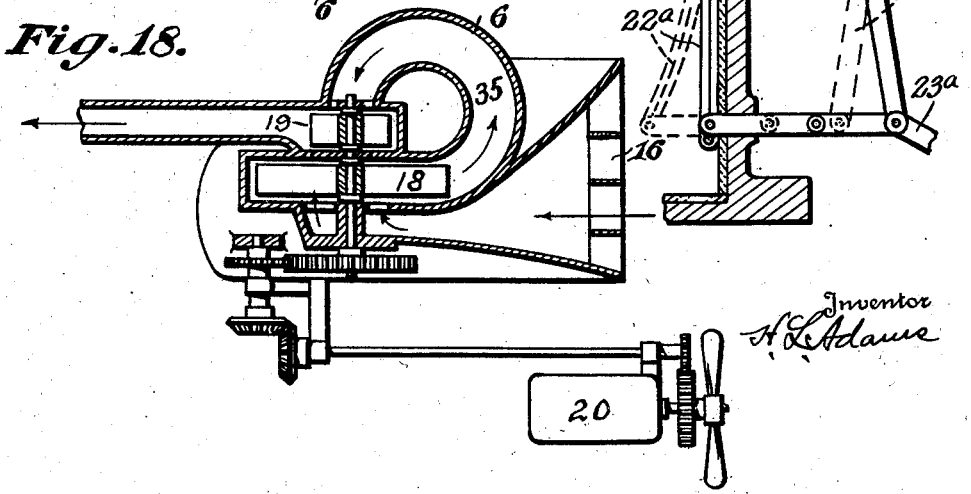

March 16, 1937. H. L. ADAMS 2,074,098
ROCKET AIRSHIP
Filed Aug. 23, 1932   5 Sheets-Sheet 4

Inventor
H. L. Adams

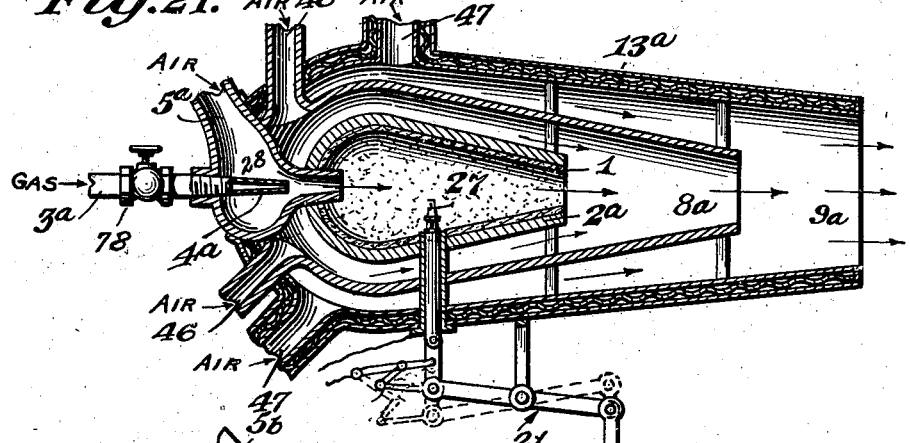
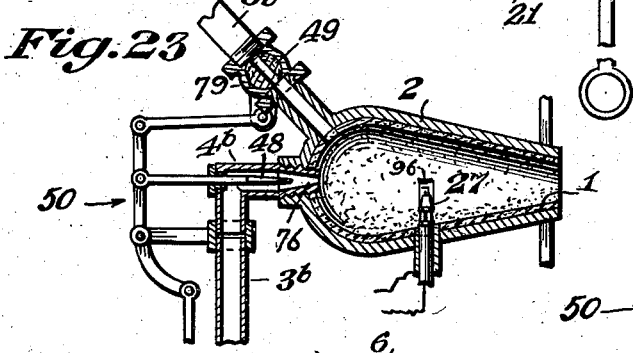
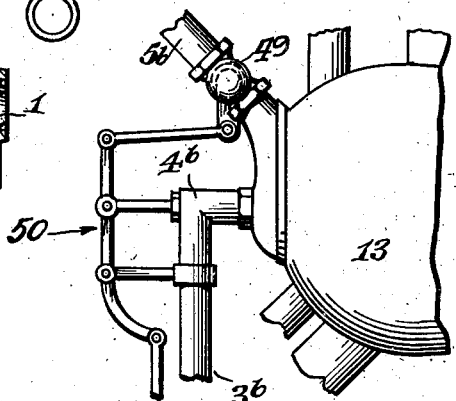
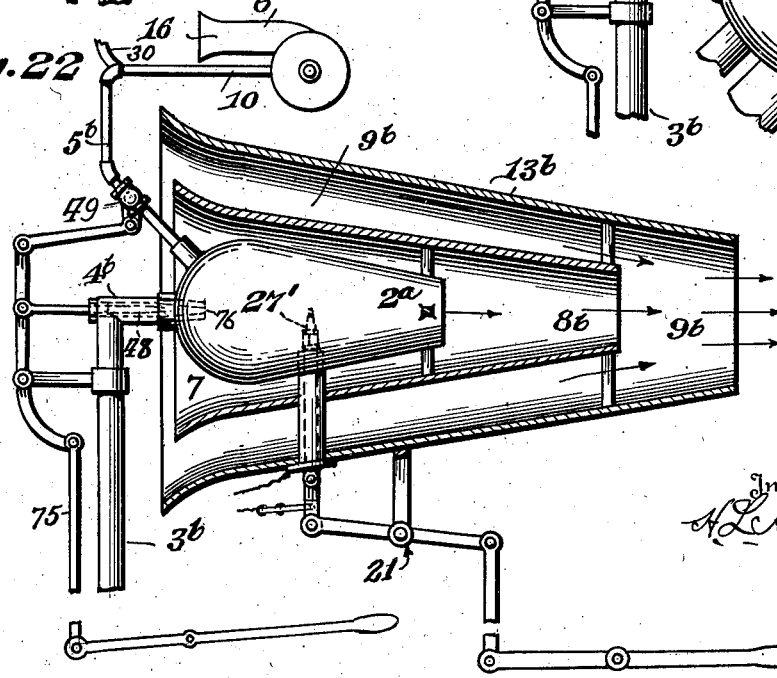

Patented Mar. 16, 1937

2,074,098

UNITED STATES PATENT OFFICE 2,074,098

ROCKET AIRSHIP

Herbert Luther Adams, Washington, D. C.

Application August 23, 1932, Serial No. 630,126

4 Claims. (Cl. 244—52)

My invention primarily relates to that class of flying machines which are heavier than air but certain details may be used on any flying machine, aircraft, or other uses.

An object of my invention is to provide double means of propelling to attain extreme high speed in travel.

A still further object is to provide a free wheeling propeller that may rotate without the operation of the engine.

A still further object is to provide a rocket motor with a high tension, high temperature steel lining, stiffened by corrugated material.

A still further object is to provide a rocket motor with a high tension, high temperature steel lining, stiffened by corrugated material and having attached fins for strength and heating radiation on the curved parts or at the entrance where construction makes it desirable.

A still further object is to provide a projecting part at the muzzle of the rocket for scooping air and forcing it back along the space between the inner and outer surface of expansion chamber of the rocket for cooling the inner walls. At the forward end of the rocket expansion chamber is connected a manifold for taking this air to the forward end of explosion chamber where it flows in with the gas or fuel oil that is ignited by a spark plug. The lining of the combustion chamber is to be made of refractory material to protect it from extreme heat.

A still further object is to provide air from a supercharger to reduce the temperature to be admitted as the air leaves the combustion chamber before entering the expansion chamber in the direction with the flow to reduce the temperature of the gas and increase the volume. A somewhat syphoning or injecting arrangement should preferably be used at this point to prevent the back flow of hot gases to the supercharger but a check valve may be used in the line for safety. The air may enter through a manifold encircling the combustion chamber adjacent the manifold from the cooling air.

A still further object is to provide a combustion chamber separate from the expansion chamber being connected thereto by a manifold having four openings into the expansion chamber. The pipe between the combustion chamber and the manifold to have an injector supplying air from a supercharger to cool the hot gases from the combustion chamber before entering the expansion chamber.

A still further object is to provide independent connections from the supercharger to cabin engine or rocket motor.

A still further object is to provide a rocket motor with a triple expansion fan or blower like device for operating propeller or propellers and to eliminate the weight of the engine if the same is found desirable.

A still further object is to provide the first fan in the motor to take the gases at high temperatures and velocity with baffle plates between that and the next motor fan which is designed with more surface to take the gases at reduced pressure and following more baffle plates to direct or straighten the gases before impinging upon the third stage of the motor fan which should be designed to take the largest quantity at a somewhat reduced pressure. These two propellers may be geared together and also geared to additional propellers to aid in obtaining stability of the craft if one rocket motor ceases to function.

A still further object is to provide a three stage supercharger with a minimum number of parts consistent with simplicity with the minimum resistance to drag and afford the maximum capacity with minimum size and power.

A still further object is to provide a rocket motor that may be so designed to scoop in air and reduce its volume through scooping and syphoning arrangement which also acts as a cooling device for the combustion chamber and adds to the volume of discharge gases. This syphoning device may be arranged in single or multiple concentrated layers.

A still further object is to provide a rocket motor that may be so designed to scoop in air and reduce its volume through scooping and syphoning arrangement which also acts as a cooling device for the combustion chamber and adds to the volume of discharge gases. This syphoning device may be arranged in single or multiple concentrated layers, having removable and attachable cowlings to which are connected piping to supercharger for supplying additional air when the air in which the rocket is travelling is too rare to supply the desired volume. These cowlings may completely cover the opening into the syphon or may cover any part desired to supply the added air and they may be arranged for one or the multiple syphoning arrangements for the rocket.

A still further object is to provide a rocket device that may utilize the exploding gases on a turbine propeller of single or multiple design either inside or outside the combustion chamber for propelling the rocket ship in the lower atmospheres while utilizing the rocket device in the rare airs of the stratosphere.

A still further object is to provide a turbine rocket having alternate turbines geared to the shaft combined with alternate turbines keyed to the shaft so that alternate turbines rotate in opposite directions but all turbines provide power to the shaft.

A still further object is to provide a combustion chamber separate from the expansion chamber being connected thereto by a manifold having four openings into the expansion chamber. The pipe between the combustion chamber and the manifold to have an injector supplying air from a supercharger to cool the hot gasses from the combustion chamber before entering the expansion chamber.

A still further object is to provide a rocket device with a highly refractory combustion chamber, so designed as to permit the use of cheaper fuels, which provide greater safety, as being less inflammable, without any decrease in efficiency in use, because it keeps the temperature high where combustion takes place almost instantaneously, due to the intense heat, even when fuels with very high flash point are used.

Also certain other advantages which will hereinafter appear.

To these ends my invention consists in certain novel features, which I will now proceed to describe and will then particularly point out in the claims. In the accompanying drawings Figure 1 is a horizontal cross section of a rocket motor showing the combustion and expansion chamber showing the arrangement of the cooling system and the intake air system with the supercharger.

Figure 2 is a horizontal cross section of the rocket motor with the combustion chamber separate from the expansion chamber.

Figure 3 is the rear view of rocket motor.

Figure 4 is a cross sectional view of rocket motor in a modified form.

Figure 5 is a cross section of rocket motor expansion chamber showing preferred form.

Figure 6 is a general assembly plan of the various parts of the device, showing one of many arrangements.

Figure 7 is a fragmentary section through a combustion chamber in accordance with this invention, showing a modified form of control for the igniting device.

Figure 8 is a horizontal cross section of the rocket device with one or more explosion chambers to one side of the center to permit the shaft of the power fan to pass through the head of the expansion chamber at the side of the explosion chamber.

Figure 9 is a front view of Figure 8.

Figure 14 is an end view of aircraft with the twin rocket device attached below the wings.

Figure 15 is a side view of triple stage supercharger arranged in series.

Figure 16 is a horizontal section through triple stage supercharger arranged in series shown in Figure 14 arranged for gearing to the main engine or propellers or it may have separate motive power all its own.

Figure 17 is a side view of supercharger with the fans arranged in tandem on the axle.

Figures 18 is a horizontal sectional view of the supercharger with the fans arranged in tandem as shown in Figure 17 showing the connection to the main engine or free wheeling propeller.

Figure 19 is an end view of rocket device attached above the planes in trunnions to aid in directing the course of the air craft up and down.

Figure 20 is a plan view of a trunnion rocket motor placed in a universal joint to give more complete control of aircraft in all directions.

Figure 21 shows a cross section through a free burning fuel rocket device with multiple injector like arrangement for cooling the combustion chamber and increasing the volume of discharge of rocket to increase the efficiency of the thrust of the rocket and to prevent the waste of energy in the form of heat escaping from the combustion chamber by radiation.

Figure 22 shows a cross section through rocket device with multiple syphoning sleeves to increase the efficiency of the thrust of the rocket and to prevent loss of energy by radiation of heat from combustion chamber.

Figure 23 is an enlarged detail of the combustion chamber shown in Figure 22 which may be made in this form or in the form shown in Figure 21 with a needle valve. This control arrangement which also operates the air valve and control arrangement for needle valve, may be used in the type shown in Figure 21 to control both the air and the fuel in that device.

Figure 24 is a part of the base of rocket motor showing the arrangement of Figure 21 adapted to use the needle valve, and control of air shown in Figures 22 and 23.

Figure 10:
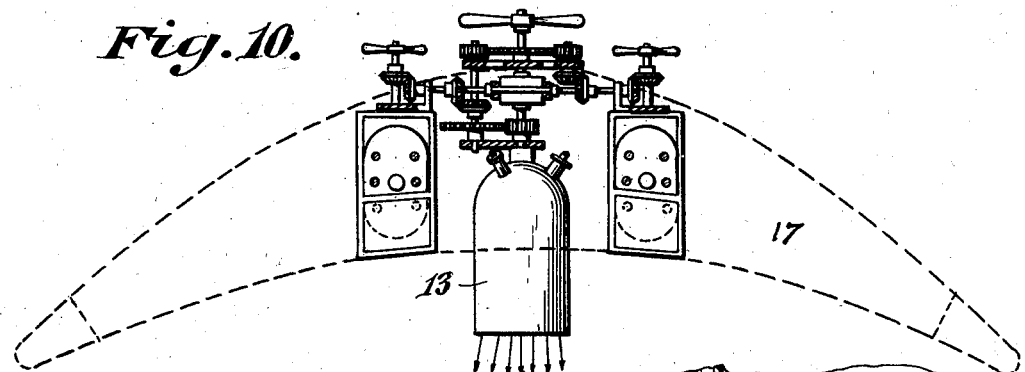
Figure 10 is a view of a general assembly plan of rocket device turbine connected to propellers showing double detachable cabins on each side of the rocket motor arranged in a tailless aircraft.

Referring to the drawings in detail, more particularly to Figure 1, the numeral 2 indicates the wall of a combustion chamber, having a lining 1 of suitable heat resisting material. A combustible mixture is adapted to be admitted to the chamber at 17, from an injector device 4, into which fuel and air are discharged through pipes 3 and 5 respectively. An igniting device, such as a spark plug 27 extends through the wall of the combustion chamber for igniting the combustible mixture admitted thereto.

From the combustion chamber, the products of combustion are passed into an expansion chamber 8, which may be formed integrally with the combustion chamber as shown in Figure 1, or may be entirely separate therefrom, as shown in Figure 2.

Extending along the outer face of the wall of the expansion chamber are a plurality of air passages 9, which may be formed by means of tubes 13 as shown in Figure 4, or by providing the expansion chamber with a spaced jacket 13' separated from the wall of the expansion chamber by means of a corrugated spacing element 12 as shown in Figure 5. Air is admitted to the passages 9 through an out-turned scoop 7 formed at the rearward end of the expansion chamber. The air flowing through the passages 9 tends to cool the wall of the expansion chamber, and preferably is discharged into the pipes 5 leading to the injector device 4. An inner end portion 14 of the expansion chamber wall is provided with stiffening and heat radiating fins 15 which extend along the inner end portions of the passages 9.

As the products of combustion enter the expansion chamber, they are mixed with air discharged through nozzles 11 preferably connected by means of pipes 10 with a supercharger 6 having an air scoop 16. If desired, the pipes 10 may be connected with the pipes 5, and the latter preferably will be provided with suitable expansion valves shown conventionally at 28 to increase the velocity of the air flowing through the pipes. Preferably all pipes will be provided with suitable valves 18.

When the expansion and combustion chambers are formed separately as shown in Figure 2, the nozzles 11 preferably will be connected with the combustion chamber by means of a pipe 19 having an injector device 20 into which the pipe 10 leading from the supercharger 6 discharges.

Instead of providing the expansion chamber with a single combustion chamber as shown in Figures 1 and 2, a plurality of combustion chambers may be provided as in the form illustrated in Figures 8 and 9. The combustion chambers in this form are duplicates of each other, and are arranged at an angle to the longitudinal axis of the expansion chamber, and in spaced relation to such axis.

A modified form of spark plug 27 is shown in Figure 8, which is slidably mounted, and provided with a link and lever mechanism 21 for withdrawing the same when desired. The purpose of the withdrawable spark plug is to enable the same to be withdrawn from contact with the terrific heat within the combustion chamber during the operation of the device, such heat being sufficient to maintain combustion of the mixture admitted thereto without the aid of any igniting means after the device has been in operation for a comparatively short time. The withdrawable type of plug may be employed with the forms of the device shown in Figures 1 and 2 if desired.

An alternate arrangement for withdrawing the spark plug which may be either manually or automatically operated is shown in Figure 7. In this arrangement, a link and lever mechanism 21a is connected with the spark plug 27a for extending or withdrawing the latter with respect to the combustion chamber. Also connected with the link and lever mechanism 21a, at the opposite end thereof from the spark plug 27a, is a thermal element 22a disposed within the combustion chamber and adapted to withdraw the spark plug when subjected to intensive heat, and to extend the same when comparatively cool.

By way of example, the thermal element shown is of the bi-metallic type adapted when cool to extend substantially parallel to the wall of the combustion chamber, and when heated to move inwardly, carrying therewith the end of the link and lever mechanism connected thereto, to withdraw the spark plug. If it is desired to operate the link and lever mechanism manually, this may be done by means of the connecting strap 23a. A protecting cap 24a may be connected with the spark plug for closing the opening in the combustion chamber, through which the spark plug is withdrawn.

In Figure 8 is shown a modified form of expansion chamber which includes a plurality of spaced transverse partitions 25, each provided with a plurality of openings 26 extending therethrough. Preferably the openings 26 increase in size through successive partitions 25, in a rearward direction. Extending through and journaled in the partitions 25 is a shaft 29 having a plurality of rotors 30 mounted thereon, one of such rotors being disposed between each pair of adjacent partitions. Suitable gearing, preferably including a clutch device 31, connects the shaft 29 with an external propeller 32.

Figure 11:
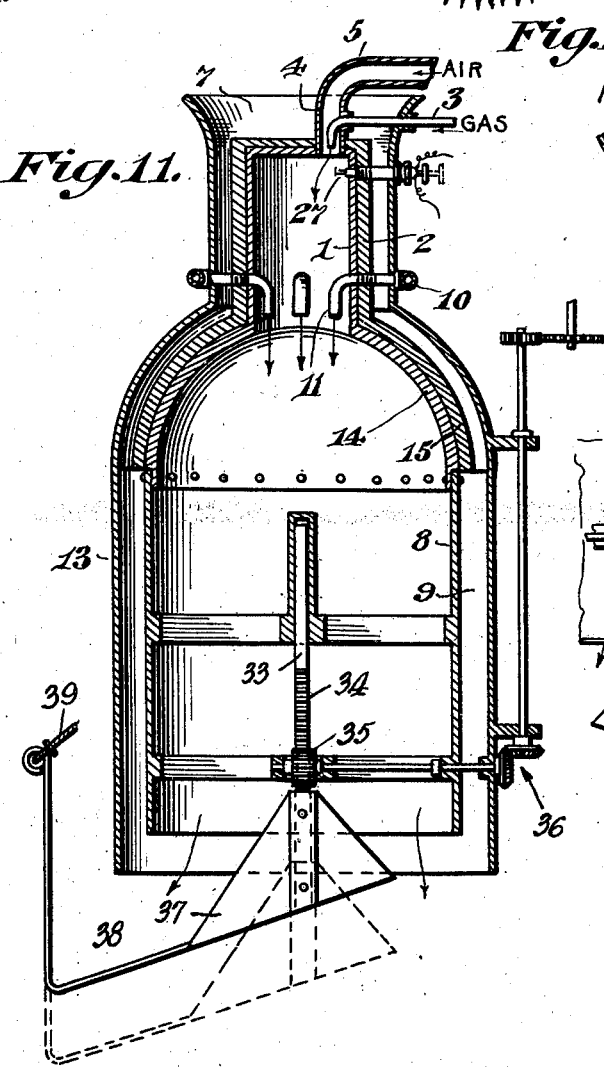
Figure 11 is a modification of the rocket device shown in Figure 1 with a direct air cooling arrangement in the place of the indirect method shown in Figure 1 and the cool air in this case need not be reused. This modification also has a steering device atttached to the end of discharge of rocket.
Figure 12:
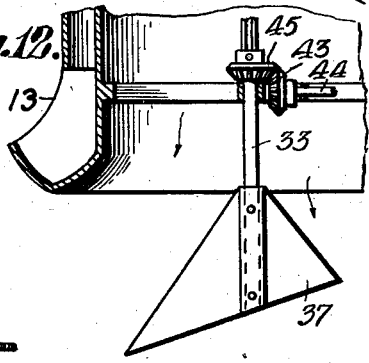
Figure 12 is a part detail of the end of rocket showing a bevelled gear attachment for rotating the steering device in the discharge of the rocket stream to aid in directing the aircraft by the discharge from the rocket.
Figure 13:
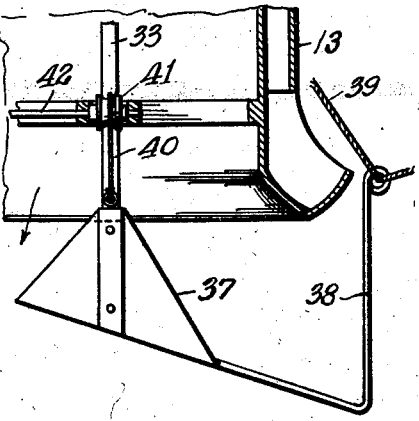
Figure 13 is a modification of Figure 12 showing another type of control of steering device for rocket ship.

The exhaust gases from the expansion chamber may be utilized for steering the aircraft by means such as shown in Figures 11, 12, and 13. The means shown in Figure 11 consists of a rod 33 mounted for sliding movement lengthwise of the chamber. The rod 33 is provided with a rack 34 which meshes with a pinion 35 which may be rotated by means of a shaft and gearing mechanism indicated at 36. Mounted on the rod 33 to move lengthwise therewith is a vane or deflecting member 37 of triangular shape which is rotatable about the longitudinal axis of the expansion chamber, and which is eccentrically mounted on the rod with the base thereof extending diagonally across the rod whereby the member projects laterally for a greater distance from one side of the rod than from the other, and also inclines rearwardly at the side of greater projection. The member 37 is provided with an arm 38, having a control line 39 attached thereto, for adjusting the position of the member about its axis of rotation.

In the steering means shown in Figure 13, the deflecting member 37 is adjusted about its axis of rotation in the same manner as in the form shown in Figure 11, but adjustment thereof lengthwise of the expansion chamber is accomplished by means of a cable 40 connecting the member with a drum 41 mounted on a rotatable shaft 42.

In the form of steering means shown in Figure 12, the member 37 may be adjusted about its axis of rotation by means of a bevel gear 43 mounted on a rotatable shaft 44, and meshing with a similar bevel gear 45 mounted on the rod 33.

A modification form of rocket device is shown in Figure 21, in which the wall 8a of the expansion chamber entirely surrounds the combustion chamber 2a, and communicates adjacent the forward end of the latter with air conduits 46, through which air is admitted to partially cool the wall of the combustion chamber, and to mix with the gases discharged therefrom at the rear end thereof. Surrounding the wall 8a is a double walled jacket 13a which provides an additional expansion chamber and air space 9a communicating adjacent its forward end with air conduits 47, through which air is admitted to cool the wall 8a, and to mix with the mixture of air and gas discharged from the rear end of the expansion chamber therein. Fuel and air are admitted through the elements 3a and 5a respectively to the injector device 4a, and the mixture is discharged into the combustion chamber 2a to be ignited by the withdrawable spark plug 27'.

A somewhat similar device is shown in Figures 22 and 23, in which the walls 8b and 13b are entirely open and slightly flared at their forward ends for the admission of air to pass therethrough to be ultimately discharged at the rear of the space 9b. In this form, the fuel line 3a and air line 5b are provided with valves 48 and 49 respectively, which are operated simultaneously by means of a link and lever mechanism 50 for controlling the discharge into the injector device 4b. This simultaneous control of fuel and air may be applied to other forms of the device as shown in Figure 24, wherein the control means is illustrated in connection with a rocket device of the form shown in Figure 27.

A spark plug 27 or any form of igniting device which may be automatically or manually, or mechanically withdrawn to get it out of the intense heat until needed may be inserted in the combustion chamber 1 at a suitable place for igniting the combustible material which when once ignited the heat of the chamber 1 should be sufficient to keep combustion going without the aid of the ignition device 27.

It is intended that the intense heat of combustion chamber 1 will be sufficient for combustion after the device has been in operation a sufficient time to get heated and the igniting device can then be withdrawn out of the path of the flame to protect it from the continual intense heat while it is not needed. This may be automatic or manual.

The size of the orifices of combustion chamber 1 and chambers 8 and 9 are to be designed to give the maximum velocity to develop the maximum power required in the case of the craft under consideration.

A thermostat controlled spark plug that automatically withdraws the spark plug 27 from the combustion chamber 1 as the heat increases towards the maximum and inserts the spark plug 27 again automatically as the heat in the combustion chamber 1 decreases below the point of combustion so that if the engine is shut off in gliding it may automatically be ignited again. The igniting takes place either by the heat of combustion chamber or the spark or igniting device 27.

The igniting device 27 also may have mechanical and manual means for inserting if the automatic means becomes inoperative for any reason.

The rocket device 13 may be used with a propeller or turbine like device in which the gases after leaving the combustion chamber 1 and entering the expansion chamber 8 in jets that direct their course against small vanes on the outer edge of a turbine similar to the stem turbine in idea but varying in structure to adapt themselves to high temperature gases may be utilized for rotating the propeller in the lower atmosphere.

The exhaust from this turbine may be used to rotate a second turbine with larger vanes in the same or opposite direction having gearing arrangements to make them change in direction to rotating in the direction of the propeller as the direction of the two fans are not the same.

Multiple turbine units may be added with the same idea. If each successive turbine rotates in opposite direction alternative turbines are attached to the shaft and the others are connected through gearing. They aid in propelling the shaft in the opposite direction from the rotation of the turbine.

The withdrawable spark plug for the rocket may have a protective cap so that when the spark plug is withdrawn it closes up the opening through which the spark plug was withdrawn keeping the heat from the combustion chamber 1 away from the spark plug 27. The withdrawing of the spark plug 27 may automatically switch off the current from the spark plug to prevent the waste of energy uselessly. This may be performed simply by a sliding contact for automatically breaking a switch by lever arrangement.

If a trunnion or trunnions are used upon the rocket device 13 the fuel and igniting system may be arranged to pass through a hollow trunnion or trunnions to give greater mobility to the rocket without interfering with the piping. Air from the supercharger may likewise be supplied through the hollow trunnion especially for the combustion chamber 1. The air and the remaining operations may be scooped in by a funnel shaped syphoning device or may be supplied through the trunnion as desired. This arrangement may be applied to all types of rocket shown without departing from the spirit of the invention. This is to have suitable valves in connections and attachments to adapt the fuel igniting device and air from their sources to the place of use.

The orifice at the mouth of the combustion chamber 1 of the rocket motor may be lined with a piece of platinum or other highly refractory substance as porcelain if the carbon lining of the combustion chamber is too frail to stand the wear at this point.

The edges of the combustion chamber where this is shall be as sharp as possible consistent with strength and durability to reduce eddies from the two gases mingling by injector action. The orifice of the needle valve into the combustion chamber 1 may be flared out or have countersunk opening to give greater spraying action to the fuel oil into the air and prevent as much as possible the formation of beads or drops that might retard complete combustion. The increasing of the pressure in the combustion chamber 1 may be obtained by making the orifice out of the combustion chamber 1 of such size that the desired pressure may be obtained for the average discharge under average conditions of the aircraft is best served.

It would of course be possible to have movable bosses or projections extending into the throat of the combustion chamber 1 discharge orifices that could be regulated to control the size of the orifice to increase the pressure in the combustion chamber to a point producing the greatest efficiency in operation of rocket motor.

The means for making the igniting device 27 inoperative may be by the throwing of a switch as the igniting device 27 is withdrawn or contact points may be made upon the igniting device 27 which breaks contact as the igniting device 27 is withdrawn.

The igniting device 27a may have a protective cover 24 similar in nature to the lining of the combustion chamber of any material desirable which closes the opening in the combustion chamber when the device is withdrawn. The opening in the walls of the expansion chamber may be countersunk and the part to fill it may be bevelled to fit the countersinking that a tight joint may be obtained.

I have shown an apparatus embodying my invention in several general forms but do not wish to be understood as limiting myself strictly to the precise details of construction herein before described. I do not wish to be held to exact shapes or dimensions or to any particular combination of parts but wish to be free to use any part herein shown or described or covered by the claims with any other part or parts whether shown herein or elsewhere.

Having thus described my invention, what I claim as new, and desire to secure by Letters Patent is:—

1. A propulsion device for aircraft comprising, a combustion chamber, means for discharging a combustible mixture into said chamber, an igniting device extending into the combustion chamber, an expansion chamber connected with the combustion chamber to receive the products of combustion therefrom, and thermostatically controlled means for withdrawing the igniting device from the combustion chamber.

2. A propulsion device for aircraft comprising, a combustion chamber having a wall formed with an opening, means for discharging a combustible mixture into said chamber, an igniting device extending through said opening, an expansion chamber connected with the combustion chamber to receive the products of combustion therefrom, means for slidably withdrawing the igniting device from said opening, and means for closing said opening upon the withdrawal of the igniting device.

3. A propulsion and steering device for aircraft comprising, a combustion chamber, an expansion chamber connected with the combustion chamber to receive the products of combustion therefrom, means for discharging air into the expansion chamber, a deflecting member rotatably mounted adjacent the discharge end of the expansion chamber and disposed diagonally to the longitudinal axis of the expansion chamber, and means for rotating said member about said longitudinal axis.

4. A propulsion and steering device for aircraft comprising, a combustion chamber, an expansion chamber connected with the combustion chamber to receive the products of combustion therefrom, means for discharging air into the expansion chamber, a deflecting member slidably and rotatably mounted with respect to the expansion chamber and disposed diagonally to the longitudinal axis of the expansion chamber, means for moving said member lengthwise of the expansion chamber and means for rotating said member about said longitudinal axis.

HERBERT LUTHER ADAMS.